Patented July 3, 1951

2,559,496

UNITED STATES PATENT OFFICE 2,559,496

SULFURIC ACID REGENERATION

Ernest A. Epps, Jr., Baton Rouge, La., assignor to Standard Oil Development Company, a corporation of Delaware No Drawing. Application January 10, 1947, Serial No. 721,463

1 Claim. (Cl. 210—42.5)

This invention relates to a process for the removal of suspended carbonaceous material from spent sulfuric acid solution and relates more particularly to the separation of suspended carbon and other carbonaceous materials from the spent sulfuric acid obtained in the preparation of alcohols by the hydration of sulfuric acid-olefin extracts.

In the manufacture of alcohols from unsaturated hydrocarbons by the use of sulfuric acid, a small portion of the unsaturated hydrocarbons is converted to materials which form tars, resins and free carbon when subjected to high temperatures needed to separate the crude alcohol from the acid. The tar and other carbonaceous materials must be removed to make the acid reconcentration equipment operable. If the removal is not complete before the acid is reconcentrated to high strength, the heat then applied causes the acid-soluble material to be decomposed to acid-insoluble material which may appear in the concentrated acid as a filterable-free carbon or as colloidal carbon. When unsaturated hydrocarbons are esterified with restored sulfuric acid, any carbon colloid present is gradually precipitated. On dilution of the acid ester extract, the carbon colloid is completely precipitated. A diluted acid extract will contain sufficient quantities of free carbon and resinous materials to lower the efficiency of operation of any subsequent piece of equipment for alcohol or acid recovery. The greatest reduction in efficiency to be expected would be in the acid restoration equipment, through fouling by free carbon. In the past, the separation of tar and carbon has been done by settling in large tanks, and at times, by centrifuging. Removal of the less highly polymerized carbonaceous materials by pressure distillation has been attempted. It has also been the practice to bleach the restored acid to remove substantially all elemental and organic carbon prior to re-use for olefin absorption.

The disadvantages inherent in each of these methods of carbon reduction can be listed as follows:

(1) Bleaching requires the use of alloys resistant to nitric acid and strong sulfuric acid at high temperatures. The excess nitric acid remaining after bleaching must be removed by the use of ammonia which reacts with the sulfuric acid to form undesirable salts such as ammonium sulfate. Availability and cost of nitric acid are additional factors to be considered.

(2) Pressure distillation of the weak spent acid on a continuous commercial scale presents operation conditions requiring pumps and lines chemically resistant to hot weak sulfuric acid and having high mechanical strength at elevated temperature and pressure. The difficulty in overcoming these conditions to the extent necessary for commercial application constitutes a strong objection to its use. Furthermore, suspended carbon is not satisfactorily removed by this process.

(3) Mechanical filtration of the suspended carbon in the weak acid requires special equipment and because of the critical nature of the operation places a heavy demand on operating personnel. For use in a continuous process the operation of two filters set up in parallel is essential so that no interruption of the process would result when washing becomes necessary. Furthermore, corrosion of equipment makes repairs and upkeep costly.

(4) In the oil flotation process, dispersed insoluble carbon is wetted with oil and separated by settling. Soluble carbonaceous material is not removed by this method.

In U. S. Serial No. 590,384, filed April 26, 1945, now Patent No. 2,512,327, June 20, 1950, in the name of Albert P. Giraitis and Truman P. Hawes and assigned to applicant's assignee, there is described and claimed, a process for the removal of carbonaceous material from spent aqueous sulfuric acid by intimately contacting the acid with a hydrocarbon oil non-reactive to the aqueous acid, separating the oil layer and withdrawing the acid free of carbonaceous material. Briefly, the spent acid recovered as still bottoms (e. g. in the distillation of crude alcohol from sulfuric acid-olefin hydrolyzed extracts), and containing elemental carbon, tars and soluble organic material is mixed with a hydrocarbon oil and settled to remove the suspended and dissolved materials mentioned, thus preventing buildup of carbonaceous material in the circulating acid.

This invention has for its object an improvement in the sulfuric acid-oil washing process as described in the aforementioned U. S. Serial No. 590,384. It is an object, therefore, of this invention to provide a process whereby the removal of carbon and small quantities of tars and resins from spent sulfuric acid is made more efficient.

The spent acid subject to regeneration by my process is a weak acid generally in the neighborhood of a 35%–50% concentration. It is commonly designated in alcohol manufacture terminology as "slop acid." In order that this acid may be re-used, it must be reconcentrated. If used for ethyl alcohol production by absorption of ethylene in sulfuric acid, it must be reconcentrated to 95% to 98% acid. Propylene absorption requires about 60%-92% acid. Higher molecular weight normal olefins require about 55%-88% acid in the absorption step. The tertiary olefins can be reacted with acid of relatively lower acid concentrations.

The purpose of this invention is accomplished by adding to the sulfuric acid oil washing step a wetting agent, particularly certain wetting agents which are the reaction products of unsaturated petroleum derivatives and strong sulfuric acid, known as petroleum sulfonates.

Hydrocarbon oil washing of weak spent sulfuric acid is generally a very satisfactory process. It has been found, however, that the removal of carbonaceous materials from the spent acid by the oil washing method is made more substantially complete by the addition of small amounts of sulfonates, sulfates, sulfonic acids, or alkyl sulfuric acids prepared from the reaction of petroleum derivatives with strong sulfuric acid.

The petroleum sulfonated compounds found to be most effective for my purpose according to the present invention are:

(1) The oil-soluble sulfonates and sulfonic acids obtained in preparing white oil by treating lubricating oil distillates having an average molecular weight of about 300. These oil-soluble sulfonates and sulfonic acids are known as mahogany sulfonates or mahogany acid and are sold commercially under the name of "Acto 500."

(2) The crude hydroxy octyl sulfonates such as those recovered from waste acids obtained in the manufacture of various alcohols from petroleum olefinic gases.

(3) The water-soluble sulfonates (green acids) obtained from the strong sulfuric acid treatment of white oils and similar lubricating oil distillates.

(4) Various petroleum aromatic and aliphatic sulfonates or sulfuric acids, such as those available by strong sulfuric acid treatment of solvent extracts.

(5) The sulfonates obtainable from the strong sulfuric acid treatment of cycle oils obtainable from cracking of gas oils and, (6) The sulfonates or sulfonic acids obtainable by strong sulfuric acid treatment of unsaturated materials of petroleum origin, or mixtures of the same. In general, materials made by the strong sulfuric acid treatment of such petroleum derivatives is a mixture of petroleum sulfonic acids and petroleum sulfonates and sulfates. All these materials as a rule are fairly good wetting agents.

The petroleum hydrocarbon-sulfuric acid derivatives which are used in accordance with my invention, are used in the amounts of 0.1 to 2.0% depending on the amount of suspended material in the spent acid. In making these petroleum sulfonate wetting agents, sulfuric acid of 93% up to and including $SO_3$ itself, may be used as the sulfonating agent.

The oil used in the hydrocarbon oil washing consists of any hydrocarbon oil stable toward the sulfuric acid near the boiling point of the acid at operating pressure. In most cases, it is preferable to wash the acid as it flows from the still and under such conditions, petroleum distillates exhibiting high flash point and high boiling range, such as lubricating oils, gas oils, cycle oils, white oils and the like, are most effective.

The amount of hydrocarbon oil used is determined by the condition of the acid but it is generally found that an amount of oil equivalent to 1 to 25 volume percent of the weak acid washed is sufficient, the settling time decreasing with increased amounts of oil. For example, when using one gallon of a 26° API gravity oil per 100 gallons of acid, 90% of the acid can be settled free of carbonaceous material in 15 minutes, 95% in one hour and 98 to 99% in 24 hours. The presence of the wetting agent assures complete removal of carbonaceous material in 5 to 15 minutes.

In general, the process is carried out in the following manner. Spent aqueous sulfuric acid (e. g., weak acid resulting from the steam stripping of sulfuric acid-olefin hydrolyzed extracts) containing carbon, tar, resins and other suspended and dissolved carbonaceous materials is preferably mixed with hydrocarbon oil and a small quantity of a petroleum sulfonate in an orifice mixer or other suitable intimate mixing equipment and then flowed to a separator where the oil and carbon separate from the acid. The acid is taken off the bottom of the separator, clear, and ready for storage or concentration. The oil-carbon layer can be disposed of as desired or used as fuel.

*Example I*

As an example of this invention experiments were conducted utilizing ethanol generator bottoms consisting of spent sulfuric acid containing carbonaceous impurities. In one case a sample of this spent acid was permitted to stand for two hours at 100° C., while in another case the spent acid was treated in accordance with the process of this invention. For this purpose 1% of a gas oil was added to the spent acid, together with a mixture of one milliliter of cycle oil and one milliliter of 95% sulfuric acid which had been reacted without addition of external heat, and had then been diluted to twenty milliliters before addition to the spent sulfuric acid. It may be observed that dilution of this nature is not necessary but is a preferred procedure. The acid, as treated in this manner, was also allowed to stand for two hours at 100° C. Carbon analyses were then made of the two acid samples; that is, of the untreated acid sample which had been allowed to stand, and of the treated acid sample which had been allowed to stand for the indicated time. The carbon analyses were as follows:

| | Total Carbon | Insoluble Carbon |
|---|---|---|
| Untreated Acid | 0.9 | 0.5 |
| Treated Acid | 0.6 | 0.0 |

After ten minutes the treated acid had a clear red-brown color while the untreated acid showed no color improvement. A small portion of the added sulfonic acid or sulfate remains in the treated acid, the remainder is adsorbed on the surface of the material which settles out. The sulfonic acid remaining in the acid does not interfere with concentration or further use of the acid.

*Example II*

An experimental plant trial of two days duration was run. In this trial, 20 gal. per hour of 98% sulfuric acid was mixed with 80 gal. per hour of cycle oil. The mixture was pumped into the ethanol generator bottoms. The separation of solid carbon from the acid in the separators was complete.

The amount of wetting agent added to the sulfuric acid-hydrocarbon oil washing will depend on the nature and amount of suspended material and the efficiency of the process under plant conditions. However, an amount of additive in the range of about 0.1 to about 2.0 volume percent, based on the amount of spent acid, is preferable although smaller or greater amounts may be used.

When the additive used is the cycle oil-sulfuric acid product, the cycle oil can be used in sufficiently large amounts and the unreacted cycle oil may be used as the spent sulfuric acid washing agent.

Various methods may be employed in adding the wetting agent to the spent acid-hydrocarbon oil mixture, such as adding it directly to the oil feed line, or to the acid line, or to the acid-oil mixing tank. It is also satisfactory to inject the additive in a small quantity at intervals to one or more of the above suggested points.

While the invention has been exemplified in connection with acid reconcentration in an olefin-hydration alcohol manufacturing process, the operation is equally adaptable to any process where acid regeneration is essential regardless of the source of the spent acid from which the carbonaceous material is to be removed.

From the above description, it is clear that a process has been found whereby the detrimental effects on acid flow through restoring or stripping equipment due to the presence of suspended elemental carbons and tars and resins present in spent sulfuric acid has been remedied by mixing hydrocarbon oil and the spent acid in the presence of a wetting agent comprising a petroleum derivative of sulfuric acid, allowing the mixture to settle and recovering sulfuric acid substantially free from suspended carbonaceous material.

The nature and objects of the present invention, having thus been set forth and specific examples of the same given, what is new and useful and desired to be secured by Letters Patent is:

Improved process for removing carbonaceous materials from spent sulfuric acid containing the same secured in the manufacture of alcohols from unsaturated hydrocarbons, which comprises separating the spent 35% to 50% sulfuric acid from the alcohol and mixing the spent acid with about one to twenty-five volume percent of a hydrocarbon oil characterized by being nonreactive to the spent acid, and adding to said mixture about 0.1 to 2.0% of a sulfonated hydrocarbon oil, allowing the mixture to settle, and separating an acid layer substantially free from carbonaceous material.

ERNEST A. EPPS, JR.

REFERENCES CITED

The following references are of record in the file of this patent:

UNITED STATES PATENTS

| Number | Name | Date |
| --- | --- | --- |
| 2,036,299 | Robinson | Apr. 7, 1936 |
| 2,143,890 | Liberthson | Jan. 17, 1939 |
| 2,343,791 | O'Dell | Mar. 7, 1944 |
| 2,426,082 | Cone | Aug. 19, 1947 |